Aug. 20, 1957 F. H. SMITH Re. 24,348
TOOLHOLDER BUSHING
Original Filed June 18, 1953
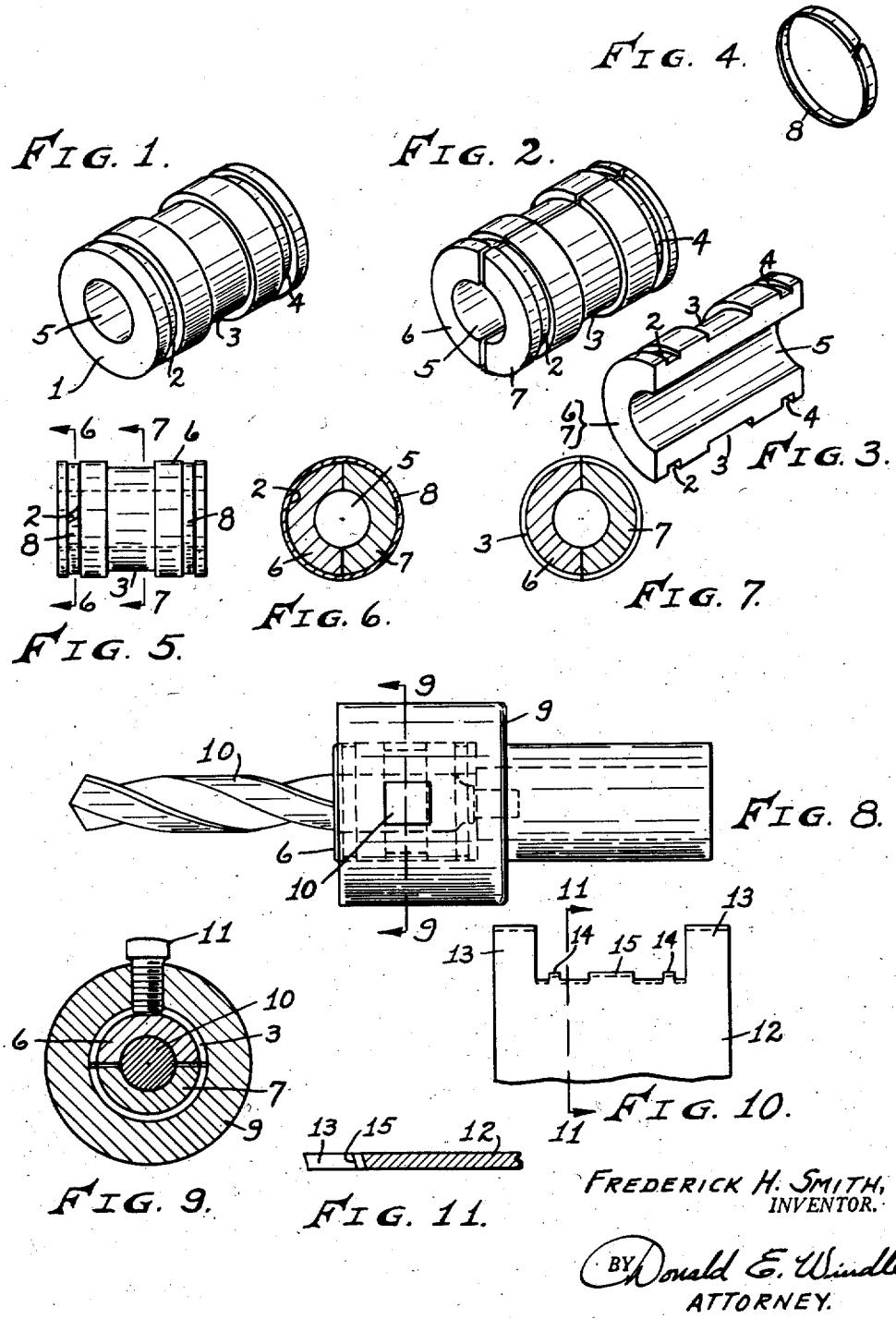
FREDERICK H. SMITH,
INVENTOR.
BY Donald E. Windle.
ATTORNEY.

United States Patent Office

Re. 24,348
Reissued Aug. 20, 1957

24,348

TOOLHOLDER BUSHING

Frederick H. Smith, Dayton, Ohio

Original No. 2,676,809, dated April 27, 1954, Serial No. 362,610, June 18, 1953. Application for reissue May 27, 1957, Serial No. 662,963

4 Claims. (Cl. 279—44)

Matter enclosed in heavy brackets [ ] appears in the original patent but forms no part of this reissue specification; matter printed in italics indicates the additions made by reissue.

I am fully aware that certain devices have been provided for analogous purposes, but it is found that these devices are not entirely satisfactory in use and are relatively expensive to manufacture.

The present invention relates particularly to a bushing used for removably securing drills, reamers, taps, and boring tools in connection with drill holders for automatic screw machines and turret lathes.

The principal object of the invention is the provision of an economically produced means for holding drills, reamers, taps, and boring tools.

A second object is the provision of a device which is composed of two identical halves and which are resiliently held together.

A further object is the provision of a device which is simple of construction, and which is easy of operation.

Further particular objects and advantages of the invention will become more apparent in the course of the following description, and that which is new will be pointed out in the appended claims.

Reference is made to the accompanying drawing, in which:

Figure 1 is an isometric detail view of the device after the same has been formed and bored from suitable stock.

Figure 2 is a view of the device after the piece, as shown in Figure 1, has been cut longitudinally thereof.

Figure 3 is an isometric view of one of the halves of the device.

Figure 4 is an isometric detail of one of the encircling bands or rings used to resiliently secure the two halves together.

Figure 5 is a side view of the assembled device.

Figure 6 is a detail section through the end portion of the bushing, as taken on line 6—6 of Figure 5.

Figure 7 is a detail section through the central portion of the device, as taken on line 7—7 of Figure 5.

Figure 8 is a detail elevation of a drill holder and a drill with the invention being embodied therein.

Figure 9 is a detail cross section, taken through the assembled drill holder on line 9—9 of Figure 8.

Figure 10 is a detail elevation of the cutting tool used in forming the bushing.

Figure 11 is a detail section through the cutting tool, as taken on line 11—11 of Figure 10.

Like characters of reference denote like parts throughout the several views.

In order that the construction and the advantages of the invention may be more readily understood and appreciated, I will now take up a detailed description thereof, in which the same will be more fully set forth.

Referring now to the drawing in detail, 1 denotes the device after the same has been formed in a lathe by means of the cutting tool shown in Figures 10 and 11, and with the tool cutting the grooves 2, 3 and 4 therearound, after which a bore 5 is formed longitudinally therethrough. After the device has been formed and drilled as shown in Figure 1, the same is cut longitudinally through the center and forming a pair of identical halves 6 and 7, as shown in Figure 2, with one of the halves being shown in Figure 3.

A pair of spring rings 8 is provided to hold the two halves together in assembled condition as shown in Figure 5. It will be noted, by referring to Figure 4, that the spring rings are split. One of the rings 8 is positioned in groove 2 while the other ring is positioned in groove 4, as indicated in Figure 5. *The spring rings 8 are flat as clearly seen in Figures 4 and 5. As clearly shown in Figure 5 the outer diameter of the spring rings 8 is less than the outer diameter of the portions of the halves adjacent the grooves 2 and 4. In other words the depth of the grooves 2 and 4 is substantially greater than the thickness of the spring rings 8.* The rings provide means of resiliently securing the two halves 6 and 7 together to the extent that the halves cannot become accidentally separated, but will permit a slight separation of the halves from each other at their dividing line. It will be noted that since the device, as indicated in Figure 1, has been cut longitudinally, each of the halves is only substantially one-half of the original device shown in Figure 1. The longitudinal cut reduces each of the members to slightly less than one half of the original piece, which normally, without a drill or similar tool being inserted therein, produces an out-of-round bore through the device, as shown in Figures 6 and 7. The outer diameter of the bushing is of substantially the same diameter as the bore in the drill holder 9, and with the bore 5 being of the correct size to fit the shank of a drill 10 of the desired size.

In assembling the device or bushing in a drill holder, the assembled bushing, as shown in Figure 5, is inserted in a drill holder 9, after which drill 10 (or other tool) is inserted in the bushing. If desired, the drill 10 (or other tool) may be inserted in the bushing before the bushing is inserted in the drill holder. The rings 8 provide resilient means permitting the halves 6 and 7 to spread sufficiently to permit easy insertion of the drill 10 (or other tool). After the bushing and the drill (or other tool) is inserted in the drill holder, set screw 11 is threaded inwardly through the wall of the drill holder with its inner end engaging the bushing in groove 3 and thereby preventing longitudinal as well as rotational movement of the bushing in the holder. Set screw 11 also serves as a means clamping the two halves 6 and 7 around the shank of the drill or other tool.

Groove 3 provides means preventing longitudinal movement of the bushing in the drill holder when engaged by the set screw and also provides a space for burrs turned up by the set screw to avoid any wedging action of the bushing in the holder which would occur if the groove 3 were not formed in the bushing, and thereby providing easy insertion and withdrawal of the bushing with relation to the holder.

The cutting tool is designated by numeral 12, and has cut-off portions 13 formed thereon. The tool also has groove-forming portions 14 for the purpose of forming the grooves 2 and 4 in the bushing. A third groove-forming portion 15 is provided on the tool for forming the groove or recess 3 around the bushing.

OPERATION

In the use of the bushing, a drill 10 or other suitable tool is inserted in the bushing, with the rings 8 providing means permitting sufficient spread of the halves 6 and 7 to permit easy insertion. The bushing, together with the drill 10, or other tool is then inserted in the holder to a position permitting the set screw 11 to be turned down against the bushing in groove 3. It will be noted, by referring to Figure 9, that the bushing is positioned in the holder to cause the set screw 11 to force one of the halves toward the other in clamping relation with the drill 10. To disengage the bushing from the holder, the set screw is loosened and turned outwardly to permit the bushing to be easily withdrawn from the holder.

It will be noted from the above that the drill is easily inserted between the halves of the bushing, due to the resiliency of the rings 8 therearound.

An important feature of the bushing resides in the fact that the set screw may be loosened a slight amount in the recess 3 and permitting the drill or other tool to be inserted into or withdrawn from the bushing without the bushing becoming disengaged from the holder. The rings 8 provide sufficient pressure against the halves 6 and 7 so as to prevent the drill or other tool from being accidently dislodged from the bushing. When it is required that the drill or other tool be removed from or inserted into the bushing, the springs exert sufficient pressure against the halves 6 and 7 to provide a snug fit. This feature of the device is a special advantage and permits the use of a gage of the proper type in establishing the amount of extension of the drill or other tool out of the bushing. This is accomplished by means of engaging the projecting end of the drill or other tool with the gage and pressing thereagainst until the gaging portion or end of the gage stops against the end of the bushing. This feature permits an operator to gage the extension of the drill or other tool at the same time and with the same motion the drill or other tool is inserted in the bushing and without having to adjust the extension of the drill or tool inwardly or outwardly before tightening the set screw.

I desire that it be understood that the device is shown in its presently preferred form, but that I am not to be limited to the specific form and arrangement of the parts herein shown and described, but that minor changes may be made therein, insofar as the changes may fall within the scope of the appended claims.

Having now shown and described the invention, what I claim, is:

1. In a tool holder bushing, the combination of a pair of [like] halves, a bore formed longitudinally of the halves, ring-receiving grooves formed around the assembled two halves, with a resilient *flat* ring being positioned in each of the ring-receiving grooves, with a set screw-receiving recess being formed around the pair of halves, and with the set screw-receiving recess being located between the ring-receiving grooves.

2. A tool holder bushing composed of a member having grooves formed therearound, a bore formed longitudinally through the bushing, with said bushing being divided longitudinally thereof and forming a pair of like halves, a pair of resilient *flat* rings encircling the two halves with each of the rings being located near each end of the bushing and with each lying in a groove of the bushing member, and a set screw-receiving groove being formed around the bushing members.

*3. A tool holder bushing according to claim 2, wherein the depth of the grooves is greater than the thickness of the rings so that the outer surface of the rings lies below the portion of the halves adjacent the grooves.*

*4. A tool holder bushing according to claim 2, wherein there is a groove provided with a flat bottom adjacent each end of the halves and wherein the inner surfaces of the flat rings mounted in the grooves are snugly seated against the bottom thereof.*

References Cited in the file of this patent or the original patent

UNITED STATES PATENTS

| | | |
|---|---|---|
| 216,143 | Brooks et al. | June 3, 1879 |
| 1,378,319 | Brooks | May 17, 1921 |
| 2,076,635 | Halstead | Apr. 13, 1937 |
| 2,355,286 | Fink | Aug. 8, 1944 |
| 2,482,603 | Toth | Sept. 20, 1949 |

FOREIGN PATENTS

| | | |
|---|---|---|
| 566,095 | Great Britain | Dec. 13, 1944 |